Figure 1:
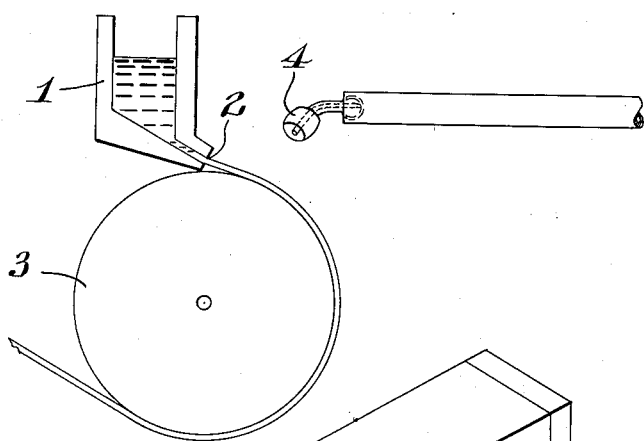

Feb. 28, 1956  W. A. CHREN ET AL  2,736,066
PROCESS FOR FILM CASTING
Filed Oct. 28, 1952

INVENTORS
WILLIAM ANTHONY CHREN
CHARLES H. HOFRICHTER, JR.
BY *A. Ralph Snyder*
ATTORNEY United States Patent Office 2,736,066
Patented Feb. 28, 1956

2,736,066

PROCESS FOR FILM CASTING

William Anthony Chren, Wilmington, Del., and Charles H. Hofrichter, Jr., Madison, Conn., assignors to E. I. du Pont de Nemours and Company, Wilmington, Del., a corporation of Delaware Application October 28, 1952, Serial No. 317,202

2 Claims. (Cl. 18—57)

This invention relates to the manufacture of polymeric thermoplastic film and, more particularly, to improvement in the process for melt casting of polymeric thermoplastic onto the surface of a rotating quenching drum.

The chief objectives in any process of extruding a synthetic, linear, film-forming, thermoplastic polymeric material into film form are those of producing a film of uniform thickness and width. The width of a film is substantially predetermined by employing a slot orifice of a particular length. The film thickness or caliper is primarily controlled by the orifice opening; and in extruding relatively thick films, that is, films having a thickness in the neighborhood of 0.05–0.1", the width of the slot orifice opening substantially fixes or determines the ultimate film thickness when, for example, the film is being quenched upon the surface of a rotating drum. However, in forming thinner films, that is, films from 0.05" down to 0.002" in thickness, the width of the orifice opening is so regulated as to act merely as the first stage in reducing the thickness of the freshly extruded film, which is in plastic state, down to its ultimate desired thickness. For example, in forming a film having an ultimate thickness of about 0.002", the width of the orifice opening may be set at about 0.015". Further reduction in film thickness is carried out by stretching the plastic film during its path of travel from the extrusion orifice to the surface of the quenching drum. Stretching is accomplished by rotating the quenching drum at a greater linear rate than the linear rate of extrusion.

One of the main difficulties encountered in establishing the ultimate film thickness by stretching the film between the orifice and the quenching drum is the prevention of film slippage on the surface of the quenching drum. The application of longitudinal tension upon the plastic film intensifies the tendency of the film to "neck-in" (reduction in film width); and as a result of the lateral forces acting on the film, the film slips laterally and unevenly upon the drum surface. This results in what is termed "scalloping," i. e., the formation of semi-circular curves along both edges of the film, the net result being the formation of a film of irregular or nonuniform width.

It is an object of the present invention, therefore, to provide for maintaining uniform film width during the quenching of a molten polymeric film upon a rotating quench drum. It is a further object to provide for adhering the edges of the film securely to the surface of the quench drum, particularly at the point of first contact between the molten film and the surface of the quench drum. A further object is to provide a process for preventing transverse slippage of the molten film on the surface of the quench drum. Other objects will be apparent from the description of invention given hereinafter.

After extensive investigation, we have found that if the edges of the freshly extruded film are caused to adhere closely to the surface of the quenching drum immediately on contact of the film with the quenching drum, transverse film slippage on the drum is effectively restrained and scalloping is substantially eliminated.

Accordingly, the present invention, briefly stated, comprises directing a localized stream or jet of inert gas, e. g., air, upon the top surface of the freshly melt-extruded film of thermoplastic polymeric material at each side edge thereof at the point where the film first contacts the surface of the quenching drum, the force of the stream or jet being sufficient to effect firm contact between the film and the surface of the quenching drum at the points of application.

While the treatment of this invention is applicable to any thermoplastic polymeric film formed by extruding molten film-forming material and solidifying the freshly extruded film on a quenching drum while imposing longitudinal stretching forces thereon, it is particularly adapted to the treatment of film formed with beaded edges as shown, for example, in the copending application of K. L. Knox, Serial No. 247,977, filed September 24, 1951.

Figure 2:
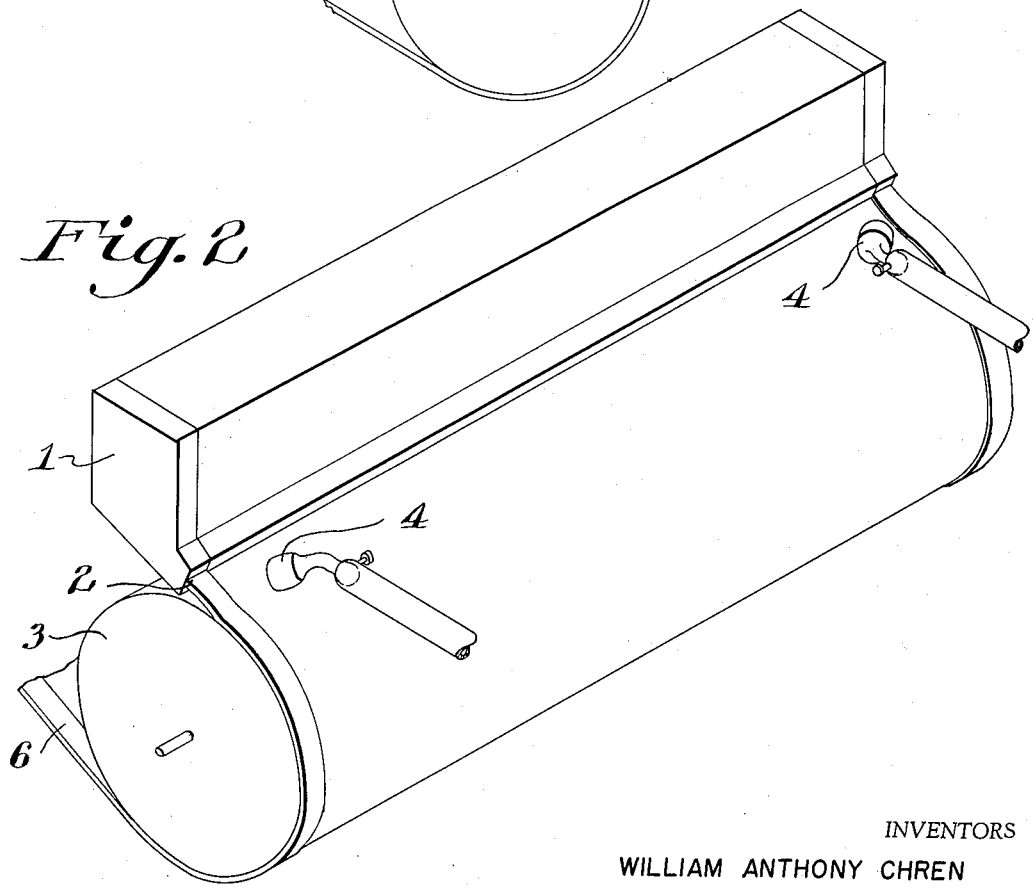

The invention will be more fully described with reference to the accompanying drawing wherein:

Figure 1 is a schematic view of an arrangement of apparatus useful in carrying out the process of this invention; and Figure 2 is a perspective view of the arrangement of Figure 1 illustrative of the preferred adaptation of this invention, namely, in the casting of beaded film.

Referring to the drawings, molten synthetic, thermoplastic, film-forming, polymeric material is extruded from an extrusion hopper 1 of any conventional design, through the orifice 2 onto the surface of a conventional, positively-driven, quenching drum 3. An air duct or nozzle 4 is suitably mounted and aligned at each end of the drum so as to direct a narrow jet or stream of inert gas (e. g., air) from a suitable source (not shown) onto the upper surface of the film adjacent the side edge thereof and at the point where the edge of the freshly extruded film initially contacts the surface of the quenching drum.

Referring specifically to Figure 2, in the preferred application of the invention, the film is extruded with beaded edges 6; and the nozzles 4 are positioned to direct air on the top side of the beaded edges of the film as the edges first contact the drum. Preferably, the air nozzles 4 are set to direct the jet of air outwardly toward the ends of the drum.

The following specific example further illustrates the operation of the process and apparatus of the invention:

Molten polyethylene terephthalate at a temperature of 270–315° C. was extruded from a slot orifice having an opening of 0.015" and provided with adjacent independently-adjustable, bead-forming orifices, each having openings of 0.018", as described in the aforementioned copending application Serial No. 247,977. The molten polymer was extruded onto the surface of a quench drum maintained at 60–80° C. and rotating at a linear surface speed of about 3 times faster than the linear rate of extrusion. The thickness of the resulting film was 0.005". The slot orifice was positioned at a distance of ¾" from the surface of the drum. Air ducts were positioned in a manner shown in Figure 2, the opening being in the form of a slit ⅟₃₂" wide by ¼" long and the slit opening was 0.25" from the upper surface of the beaded edges of the film, the length of the slit opening being positioned horizontally. The intensity of the air jets was adjusted so that the beaded edges of the film were firmly adhered to the drum at the points of initial contact. The resulting film was of uniform caliper and width, and there was no evidence of scalloping at the edges of the film.

The intensity of the air stream impinging upon the beaded edges of the film may be adjusted in accordance with the essential variables of extrusion rate, film temperature, drum temperature, degree of stretch, and general strength properties of the particular polymer being extruded. Adjustment of the rate of the air jet impinging upon the edges of the film is essentially determined by the results desired, that is, firm adhesion of the edges to the quench drum surface without disturbing the thickness of the film in areas adjacent to the edges of the film.

It should be understood that the preferred embodiment of the present invention comprises extruding a synthetic, linear, film-forming, organic, thermoplastic material into the form of a film having beaded edges and quenching the molten film upon the surface of a quench drum while impinging a directed stream of air upon the top surface of the beaded edges at the points where the beaded edges first contact the surface of the quench drum. The beaded edges are firmly adhered to the drum surface, whereas the main body of the film between the beaded edges does not contact the surface of the drum under ordinary circumstances. By ordinary circumstances is meant that the thickness of the beaded edge is usually at least twice as thick as the main body of the film, and this differential in thickness is sufficient to separate the main body of the film from the surface of the quench drum. The preferred practice of the present invention not only proves to be highly useful from the standpoint of preventing transverse film slippage, but is also highly advantageous from the standpoint of stripping the form-stable polymeric film from the surface of the drum. Experience in stripping a film having beaded edges from the surface of a quench drum, the film having been quenched in accordance with the practice of the present invention, has shown that the beaded edges readily strip cleanly from the drum surface; and no difficulties are encountered in stripping the main body in view of substantially no contact between the film and the drum surface.

Any type of synthetic, linear, organic, film-forming, polymeric material may be formed from molten condition in accordance with the present invention, for example, various polyesters such as polyethylene terephthalate, described in U. S. P. 2,465,319; polyamides, e. g., polyhexamethylene adipamide, polyhexamethylene sebacamide, polycaproamide, and other types described in U. S. Patents 2,071,250 and 2,071,253; vinylidene chloride; rubber hydrochloride, polystyrene; and various other polymeric materials which are useful in film form.

As many different embodiments may be made without departing from the spirit and scope of the invention, it is to be understood that said invention is in no wise restricted save as set forth in the appended claims.

We claim:

1. In the process wherein molten, thermoplastic, film-forming, synthetic, polymeric material is extruded in the form of a thin film onto a moving quenching surface and longitudinal stretching forces are imposed on the freshly extruded film prior to quenching, the improvement which comprises directing a localized jet of inert gas against the upper surface of the film adjacent each side edge thereof only, at the point where said side edge of the film first contacts the quenching surface, and with sufficient force to effect firm contact between the film and said quenching surface, whereby the edges of the film are caused to firmly adhere to the quenching surface at said point.

2. In the process wherein molten, thermoplastic, film-forming, synthetic, polymeric material is extruded in the form of a thin film having beaded edges onto a moving quenching surface and longitudinal stretching forces are imposed on the freshly extruded film prior to quenching, the improvement which comprises directing a localized jet of inert gas onto the upper surface of said beaded edges only, at the points where said beaded edges first contact the quenching surface, and with sufficient force to effect firm contact between the film and said quenching surface, whereby the edges of the film are caused to firmly adhere to the quenching surface at said points.

References Cited in the file of this patent

UNITED STATES PATENTS

| Number | Name | Date |
|---|---|---|
| 2,289,774 | Graves | July 14, 1942 |
| 2,364,435 | Foster et al. | Dec. 5, 1944 |